UNITED STATES PATENT OFFICE.

KURT ZIMMERMANN, OF ELBERFELD, GERMANY, ASSIGNOR TO SYNTHETIC PATENTS CO., INC., OF NEW YORK, N. Y., A CORPORATION OF NEW YORK.

PROCESS OF MAKING ETHYL TRIACETYLGALLATE.

1,222,345. Specification of Letters Patent. Patented Apr. 10, 1917.

No Drawing. Application filed January 5, 1914. Serial No. 810,464.

*To all whom it may concern:*

Be it known that I, KURT ZIMMERMANN, doctor of philosophy, chemist, citizen of the German Empire, residing at Elberfeld, Germany, have invented new and useful Improvements in Processes of Making Ethyl Triacetylgallate, of which the following is a specification.

My invention relates to the manufacture and production of the hitherto unknown esters of the triacetyl gallic acid. They can be obtained by replacing the hydrogens of the oxy groups in the gallic esters by the acetyl group.

The new compounds having most probably the formula:

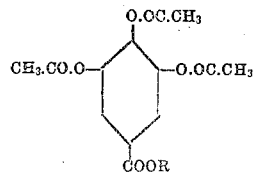

(R meaning an alkyl containing at least two carbon atoms, e. g. $-C_2H_5$, $-C_3H_7$, $-CH_2-COCH_3$) have proved to be valuable astringents. They are generally whitish, tasteless and odorless crystals which are insoluble in water and difficultly soluble in cold alcohol but soluble in hot alcohol. Upon treatment with hot caustic soda lye they are saponified, gallic acid being obtained.

In order to illustrate the new process more fully the following example is given, the parts being by weight:—10 parts of the ethylester of gallic acid are boiled during 2 hours with 16.5 parts of acetic acid anhydrid and the solution, after being cooled, is poured into cold water. A solid powder separates which has to be well washed and which is recrystallized from alcohol. The ethylester of the triacetylgallic acid thus obtained forms whitish, tasteless and odorless crystals (melting point at from 134–136° C.) which are insoluble in water, soluble in hot alcohol, difficultly soluble in cold alcohol and toluene.

In an analogous manner the other esters of the triacetylgallic acid are obtained, such as the propyl-ester (whitish powder melting point at about 81° C.) the acetol-ester (whitish powder melting point at from 104–106° C.)

Instead of the acetic acid anhydrid other acetylizing agents, such as acetylchlorid, etc., can be used.

I claim:—

1. The process of making ethyl triacetylgallate which comprises boiling ethyl gallate for about 2 hours with substantially more than the theoretical equivalent of acetic anhydrid, and then isolating the resulting ethyl triacetylgallate.

2. The process of making ethyl triacetylgallate which comprises boiling about 10 parts of ethyl gallate for about 2 hours with 16.5 parts of acetic anhydrid, precipitating the resulting ethyl triacetylgallate by pouring the mixture into cold water, and recrystallizing said ester from alcohol.

In testimony whereof I have hereunto set my hand in the presence of two subscribing witnesses.

KURT ZIMMERMANN. [L. S.]

Witnesses:
HELEN NUFER,
ALBERT NUFER.